T. C. Wales,

Rubber Shoe.

No. 3,942. Reissued Apr. 26, 1870.

Witnesses

S. N. Piper

J. R. Snow

Thomas C. Wales by his attorney

N. Wady

N. PETERS, PHOTO-LITHOGRAPHER, WASHINGTON, D. C.

United States Patent Office.

THOMAS C. WALES, OF DORCHESTER, MASSACHUSETTS.

*Letters Patent No.* 37,413, *dated January* 13, 1863; *reissue No.* 3,942, *dated April* 26, 1870.

IMPROVED WATER-PROOF SHOE.

The Schedule referred to in these Letters Patent and making part of the same

*To all persons to whom these presents may come:*

Whereas, Letters Patent No. 37,413, dated January 13, 1863, have been granted to me, THOMAS C. WALES, now or late of Dorchester, of the State of Massachusetts, for an Improvement in Water-Proof Shoes; and whereas such are believed to be invalid, inoperative, or not fully available to me, by reason of a defective or insufficient description or claim, and whereas, I, the said WALES, have applied for a new patent to be issued to me on the said invention on a new, amended, or complete specification.

Now, therefore, I do hereby declare the said invention to be fully described as follows, reference being had to the accompanying drawings, of which—

Figure 1:
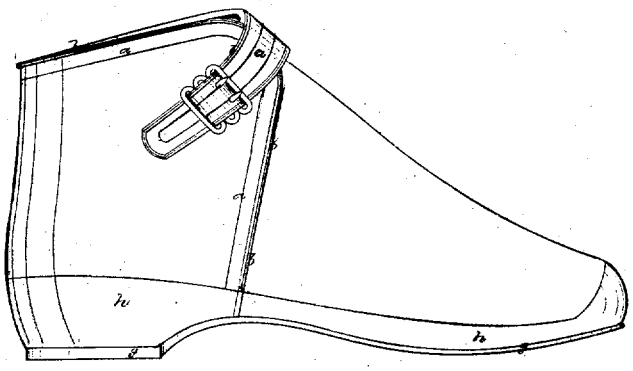

Figure 1 denotes a side elevation of a shoe provided with my invention.

Figure 2:
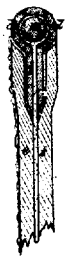

Figure 2 denotes a sectional view, on an enlarged scale, of the binding-cord, its lap or cover, and the two edges of the upper, to which they are applied.

The shoe to which my invention especially appertains is the water-proof shoe made of cloth and caoutchouc, a gaiter-shoe of this particular description being shown in the drawing, fig. 1. The upper part of the said shoe is composed of two layers of cloth cemented together by India-rubber cement. The mode of finishing the edges of the upper or of making and applying the binding thereto, and what constitutes the nature of my improvement, is as follows:

In fig. 1 this binding, as it projects beyond the upper *a*, is shown at *b*. In making it, a cord, or its equivalent, *c*, is covered by a narrow band or lap, *d*, which, on being folded together or doubled longitudinally, has the cord laid within the parts so doubled.

Prior to laying the cord within the folds of the band, cement should be applied to the inner surface of the said band, in order that, when the band is folded on the cord, the latter shall not only be cemented to the band, but the two overlapping parts of the band be secured together. In this state the band is to be introduced between the two layers of cloth composing the upper of the shoe, and is to be confined in place by cement, that part of the band immediately surrounding the cord being caused to project beyond the top or edges of the upper. In this way the cord and its cover constitute not only a stiffener to the upper, but aid in finishing it.

In fig. 2, the cord is shown at *c*, while its covering band is exhibited at *d*, the inner and outer layers of cloth being shown at *e f*.

The upper of the shoe, in other respects, is to be made and to be cemented to the sole *g*, and to a foxing, *h*, in the usual manner of making various kinds of water-proof shoes.

I claim—

The combination of a binding-cord, *c*, and a lapping band or cover, *d*, together, and with the two layers or pieces, *e f*, of cloth or other material, forming part of the upper of a shoe.

Also, as a new or improved manufacture and of my invention, a shoe, as made, with its upper provided with a strengthening-cord, *c*, a lapping or covering band, *d*, and two layers, *e f*, of cloth or other material, arranged against the outside surface of such band and cemented thereto, substantially in manner as set forth, the arrangement causing the lapping band to be exposed to view, and to constitute a finish between the two outside layers, as represented.

THOS. C. WALES.

Witnesses:
R. H. EDDY,
J. R. SNOW.